March 9, 1965 G. GRAHOVAC 3,172,298

CONTROL FOR AUTOMATIC TRANSMISSIONS

Filed June 12, 1963 2 Sheets-Sheet 1

INVENTOR.
George Grahovac
BY W. B. Harpman
ATTORNEY.

March 9, 1965 G. GRAHOVAC 3,172,298

CONTROL FOR AUTOMATIC TRANSMISSIONS

Filed June 12, 1963 2 Sheets-Sheet 2

INVENTOR.
George Grahovac
BY W. B. Harpman
ATTORNEY.

United States Patent Office 3,172,298
Patented Mar. 9, 1965

3,172,298

CONTROL FOR AUTOMATIC TRANSMISSIONS

George Grahovac, 126 Kenmore, Youngstown, Ohio

Filed June 12, 1963, Ser. No. 287,319
4 Claims. (Cl. 74—335)

This invention relates generally to automatic transmissions and more particularly to a control device for enabling the automatic transmission to be manually controlled.

The principal object of the invention is the provision of a simple and efficient control device for the governor mechanism in an automatic transmission.

A further object of the invention is the provision of a device that may be attached to an automatic transmission of the Hydramatic type for imparting manual control to the same to cause it to hold in a predetermined gear.

A still further object of the invention is the provision of a control device for an automatic transmission that permits the transmission to operate in its normal automatic cycling when desired.

A still further object of the invention is the provision of a control device for an automatic transmission that may be operated from the usual gear selector mechanism.

The control device for an automatic transmission as disclosed herein provides positive selection of first, second, third and fourth gears in an automatic transmission and holds the selected gear under the manual control of the driver. The control device can be used with any type of automatic transmission with proper adapters and enables the automobile equipped with the device to be operated normally or with manual control of the gear ratio in the transmission as desired. The particular advantage obtained with the use of the control device is the overcontrol of the normal governor action in an automatic transmission so that when the control lever is placed in first gear, the transmission will respond and it will remain in first gear as long as the control lever is so positioned. Shifting in the transmission is, therefore, under the complete manual control of the driver and by moving the shift lever to second or third the transmission will respond but not until the control lever is so moved. For normal operation the control lever is positioned in fourth gear or high or drive as it may alternately be indicated and the transmission operates normally automatically under the control of its built-in governor system.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawings, wherein.

Figure 1:
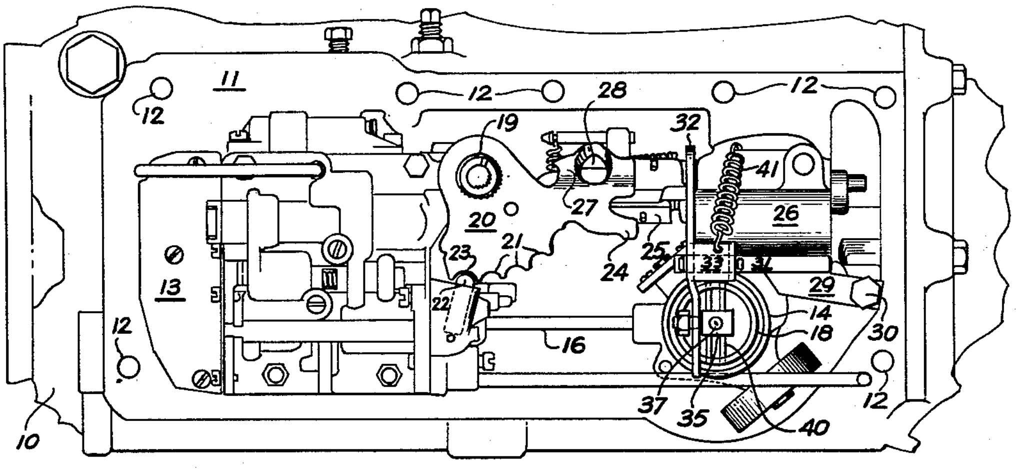
FIGURE 1 is a side elevation of a portion of an automatic transmission showing the control device installed thereon.

By referring to the drawings and FIGURE 1 in particular, a side view of a portion of an automatic transmission housing 10 will be seen and it will be observed that a vertically disposed flat mounting surface 11 appears in the foreground on the outside of the housing 10 and is adapted to receive a flanged cover (not shown) which is bolted thereto by means of bolts engaging a plurality of threaded apertures 12, 12 in the mounting surface 11. The area thus defined locates and mounts the controlling governor valve and actuating assembly for the automatic transmission, the hydraulic valve assembly being generally indicated by the numeral 13 and the hydraulic governor which comprises a governor oil delivery sleeve 14 and governor body 18 rotatably positioned therein and means for moving valves in said governor body are generally indicated by the numerals 15 and 15A. The oil lines extending from the hydraulic valve assembly 13 to the governor oil delivery sleeve are shown and indicated by the numerals 16 and 17 respectively, and those skilled in the art of automatic transmissions and particularly a Hydramatic transmission will recognize these parts as standard equipment.

Figure 4:
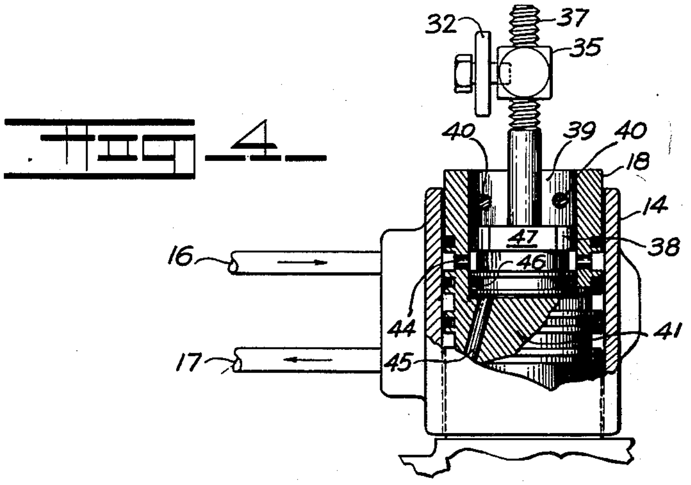
FIGURE 4 is an enlarged vertical section of the governor portion of the automatic transmission showing a portion of the control device engaged therein.

In operation, the rear pump mechanism of the transmission (not shown) operates to rotate the fluid controlling governor body 18 in the governor oil delivery sleeve 14 and the valves 15 and 15A control the oil flowing therethrough and in the oil lines 16 and 17 as may be seen in enlarged detail in FIGURE 4 of the drawings. When the automatic transmission operates normally, the governor body 18 has full control of the oil flow through the same. The present invention relates to a device for overcontrolling the governor body 18 and diverting the oil flow as described to effect control of the oil passing therethrough and in the lines 16 and 17 regardless of the action of the governor body or speed of the engine to which the automatic transmission is attached.

In normal operation, the valves in the governor body 18 control the hydraulic valve assembly 13 which in turn controls the selection of the gear ratio in the automatic transmission and by overcontrolling the governor action the transmission may be caused to hold in any particular gear ratio desired regardless of the speed of the engine and the attached parts in the automatic transmission. The gear selector mechanism which is used to preposition the hydraulic valves in the hydraulic valve assembly 13 is connected to the operating shaft 19 which extends horizontally and sidewardly out of the cover secured to the sides of the housing of the transmission as heretofore described and the shaft 19 has a quadrant 20 keyed thereto and movable in an arc based thereon and is normally provided with a plurality of depressions 21, 21 which progressively engage a spring urged detent 22 positioned on the side of the hydraulic valve assembly 13.

Figure 2:
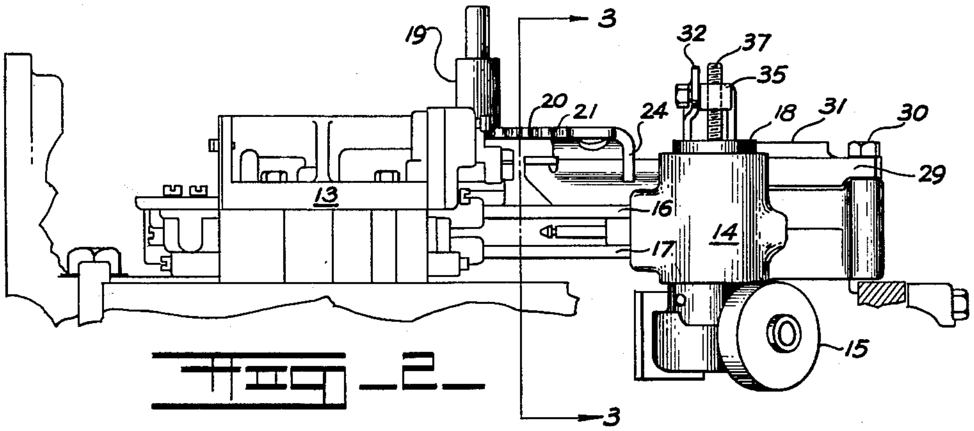
FIGURE 2 is a side elevation of the portion of the transmission shown in FIGURE 1.
Figure 3:
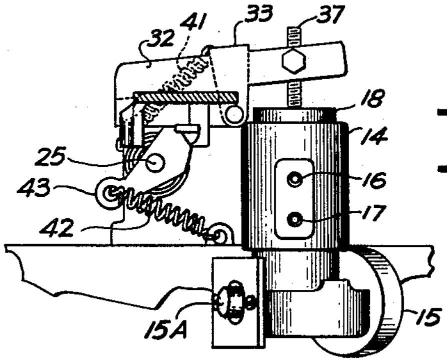
FIGURE 3 is a vertical section on line 3—3 of FIGURE 2 and showing the control device in greater detail.
Figure 5:
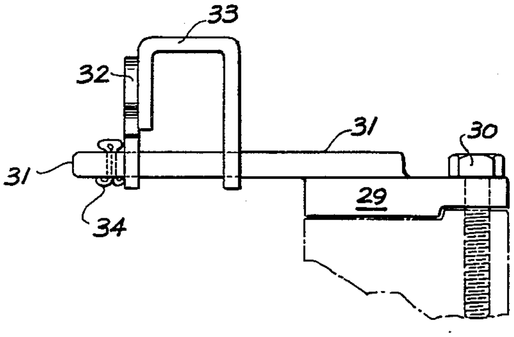
FIGURE 5 is an enlarged detail of a portion of the control device seen in FIGURES 1, 2 and 3.
Figure 6:
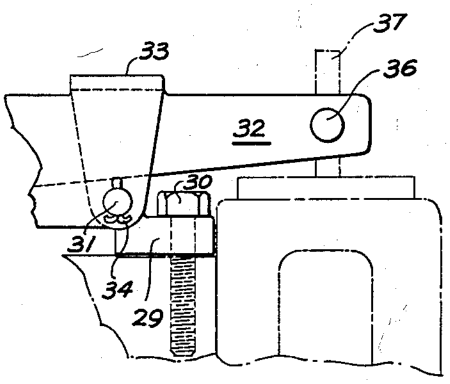
FIGURE 6 is a detailed view of the portion of the device seen in FIGURE 5 and taken at right angles thereto.

In the present disclosure an added detent registering depression 23 is formed in the quadrant 20 and as illustrated in FIGURES 1, 2 and 3 of the drawings the control device disclosed herein is in operating position. A curved arm 24 extends from the quadrant 20 and curves inwardly toward the transmission housing and is so positioned as to engage beneath a lever 25 which has an offset body portion rotatably positioned in a cylindrical portion 26 adjacent the piston and cylinder assembly 14 heretofore referred to and which lever normally controls the reverse gear in the automatic transmission. The quadrant 20 also has an apertured extension 27 which engages a projection 28 on the upper side of the lever 25 and which projection 28 which like the portion 25 thereof is offset from the longitudinal axis of the lever as heretofore described. Thus, arcuate motion of the quadant 20 enables the arm 24 and the apertured member 27 thereof which are offset from the plane of the quadrant 20 to move the lever 25 as will be understood by those skilled in the art. The motion of the lever 25 is utilized in the present disclosure to actuate the control device and effect control of the governor body 18 heretofore refered to. The contol and the actuation are accomplished by providing a mounting bracket 29 for attachment adjacent the cylindrical member 26 by a bolt 30 so that a cross sectionally round extension 31 of the bracket 29 is positioned on a parallel axis relative to the lever 25 and spaced between the same and the governor body 18 of the device. An operating arm 32 is pivoted intermediate its ends on the round extension 31 of the bracket 29 and the operating arm 32 has an offset inverted U-shaped extension 33 the outer end of which is apertured and also pivotally engaged on the round extension 31 as best seen in FIGURES 5 and 6 of the drawings. A cotter pin 34 secures the arm 32 against displacement. One end of the arm 32 engages a portion of the lever 25 so as to be moved upwardly thereby, toward the viewer as seen in FIGURE 1 of the drawings when the quadrant 20 is moved to the position illustrated, and the other end of the arm 32 has an apertured member 35 pivotally secured thereto in an opening 36 as seen in FIGURE 6 of the drawings, the apertured member 35 being threadably engaged on a threaded shaft 37 which in turn extends horizontally from an overcontrol piston valve 38 disposed within a hollow chamber 39 formed in the outer end of the governor body 18. Transversely positioned keepers 40 extend across the chamber in the governor body 18 and define the upper limits of motion of the overcontrol piston 18. The outer end of the governor body 18 defines the opposite limit of motion. The end of the operating arm 32 which engages the lever 25 is urged thereagainst by a spring 41 which extends between the inverted U-shaped extension 33 thereof and a portion of the cylindrical member 26 heretofore referred to. The biasing action thus imparted the arm 32 tends to elevate the opposite end thereof which carries the apertured member 35 which in turn engages the threaded shaft 37 heretofore referred to, and the lever 25 is also biased by a spring 42, as seen in FIGURE 3 of the drawings, which engages an offset section 43 of the lever 25 and a portion of the governor assembly. Thus, the several operating parts are held in engagement with one another so that motion originating with the quadrant 20 and imparted to the lever 25 will also actuate the operating arm 32 and hence the overcontrol piston valve 38.

In normal operation, the governor body 18 revolves at a speed comparable to the transmission drive and the valves 15 and 15A therein open and close responsive thereto, so that the oil delivered to the hydraulic valve assembly 13 through the governor body 18 and governor oil delivery sleeve 14 is under their control.

In the present invention, the overcontrol piston valve 38 is movably mounted in a chamber 39 formed in the governor body so as to control oil normally flowing therethrough. The overcontrol piston valve 38 is provided with a piston ring 46. It will be seen that the piston valve 38 blocks the normal flow of oil through channels 44 and 45 in the governor body 18 only when the piston valve 38 is in lower position in the chamber 39. In such position, which is responsive to the movement of the quadrant 20 as hereinbefore described, the oil coming from the pumps comprising the pressure source in the transmission enters the channel 44 which permits communication outwardly of the piston ring 46 and the oil simply vents outwardly through a groove 47 in the side of the overcontrol piston valve 38. The oil therefore will not flow between the lines 16 and 17 and the hydraulic valve assembly 13 remains inoperative thus holding the transmission in the gear ratio selected and the automobile engine equipped with the modified transmission can thus be run to any desired speed without the automatic transmission changing gear ratios as would ordinarily be the case.

When the overcontrol piston valve 38 is permitted to move outwardly of the governor body 18 as heretofore described the governor body 18 will then direct oil responsive to the governor valves 15 and 15A and the oil will then flow through the oil lines 16 and 17 in a normal automatic operation.

It will thus be seen that a control device for an automatic transmission has been disclosed which simply and effectively overcontrols the governor body of the transmisison control means to effect a desired operation.

The invention disclosed therefore meets the several objects of the invention, and having thus described my invention, what I claim is:

1. A control device for an automatic transmission comprising in combination a governor assembly including a governor assembly including a governor oil delivery sleeve, a governor body therein, a movable quadrant having actuating members extending therefrom, a lever having offset portions thereon rotatable on its axis by said extending members of said quadrant and an overcontrol piston valve disposed in a chamber formed in said governor body in said governor assembly, an operating arm engaging said lever, a shaft engaged by said operating arm and engaged on said overcontrol piston valve and means pivotally mounting said operating arm intermediate said lever and shaft whereby motion of said lever is imparted to said overcontrol piston valve to control oil flow through said governor body in said governor assembly.

2. The control device set forth in claim 1 and wherein spring means bias said operating arm toward said lever and secondary spring means bias said lever toward said actuating members of said quadrant.

3. The control device set forth in claim 1 and wherein keepers are provided on said governor body and arranged to limit the outward movement of said overcontrol piston valve relative thereto.

4. The control device set forth in claim 1 and wherein said overcontrol piston valve has a fluid passageway formed inwardly from an outer end thereof and pressure rings sealingly engaging said governor body inwardly of said fluid passageway.

References Cited by the Examiner

UNITED STATES PATENTS 2,177,872 10/39 Dunn ---------------- 74—752
3,096,667 7/63 Dickeson -------------- 74—731

DON A. WAITE, *Primary Examiner.*